Patented June 25, 1946

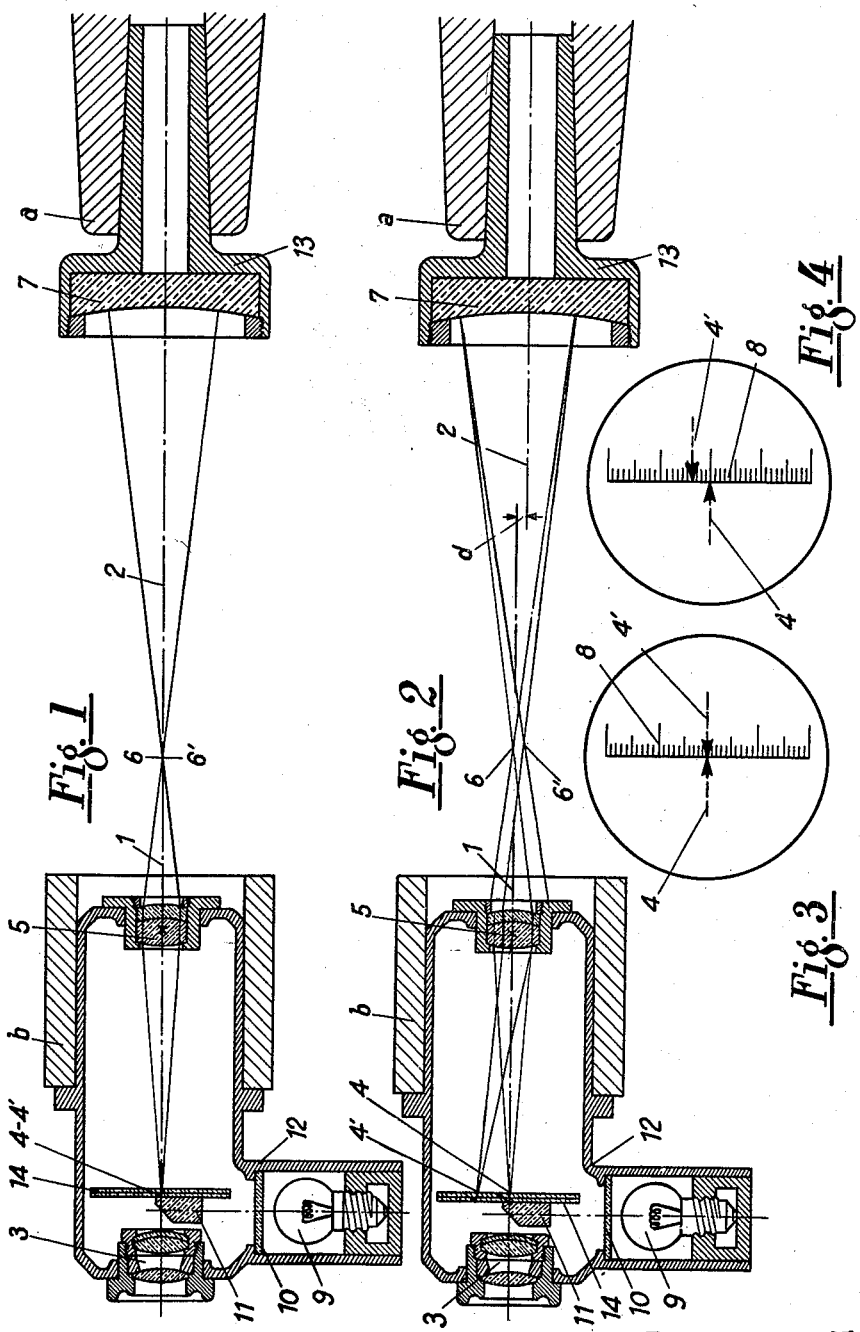

2,402,856

UNITED STATES PATENT OFFICE 2,402,856

OPTICAL DEVICE FOR CHECKING THE ALIGNMENT OF THE GEOMETRICAL AXES OF TWO MECHANICAL PARTS

Fernand Turrettini, Geneva, Switzerland, assignor to the firm Societe Genevoise D'Instruments de Physique, Geneva, Switzerland Application September 24, 1942, Serial No. 459,575
In Switzerland June 27, 1942

1 Claim. (Cl. 88—14)

Optical devices for checking the alignment of the geometrical axes of two mechanical parts are already known. These devices comprise a converging and reflecting optical system mounted on one of the parts concentrically to the axis of the latter, and, mounted on the other part concentrically to its axis a reference mark and an ocular for the observation of this mark and of its reflected image.

In all the following, in order to simplify, one supposes that the converging and reflecting system is a concave mirror. It is obvious that the same result will be obtained with an objective combined with a mirror.

When the reference mark does not lie in the axis of the reflecting optical system, its reflected image appears at twice the distance separating the axes whose alignment must be checked, the ocular thus permitting to observe simultaneously the reference mark and its reflected image, and eventually to evaluate the spacing by means of a graduation.

These devices have the drawback that their magnifying power is that of the ocular itself and that it cannot be reinforced without prejudice to the neatness with which the image reflected by the mirror is observed, because the numerical aperture of the latter is small and its separating power is weak.

The device according to the invention eliminates this drawback. It is characterized by at least one objective inserted between the centre of curvature of the reflecting system and the reference mark and intended to magnify, in the field of the ocular, the spacing between the mark and its image.

One understands at once that the misalignments are amplified by this artifice without that the apparent size of the mark and of its image at the focus of the ocular be magnified in the same proportion.

The attached drawing represents, by way of example, an embodiment of the invention applied to a horizontal boring machine, of which $a$ is the broach and $b$ the counter-bearing.

Figs. 1 and 2 are schematical axial cross sections of this embodiment, the first one, when the axis of the broach and that of the counter-bearing are aligned, the second one, when these axes are set apart by a distance $d$. The Figs. 3 and 4 are respectively views of the field of the ocular when the axes are aligned, and when they are set apart.

In these figures, 12 is a housing mounted in the counter-bearing $b$. It carries an ocular 3 and a mark 4 constituted, for instance, by an arrow placed in the middle of a graduation 8 traced on transparent plate 14 mounted at the focus of the ocular. The objective 5, mounted also in the housing 12, forms in a point 6 located in the centre of curvature of the mirror 7 an image of the mark reduced in the ratio of the distance 5—6 to the distance 4—5. The image 6 reflected by the concave mirror 7, carried by a support 13 mounted in the broach $a$, appears again in a point 6' which, in Fig. 1, coincides with 6, the dimensions remaining the same. The objective 5 takes again the image 6', which has been reflected by the mirror and reduced by the objective 5, to project it again in 4' which, in the particular case, coincides with 4, its apparent size being this time increased in the same ratio. One sees that after having been reduced and then increased in the same ratio, the image 4' of the mark 4 will be equal to it in apparent dimension. It is observed with the ocular 3, seeing it under the aspect given in Fig. 3, when the axes 1 and 2 coincide.

On the other hand, if the axes 1 and 2 do not coincide (Figs. 2 and 4), the image 6' is separated from the image 6 by a spacing which is equal to twice the distance between $d$ the axes 1 and 2. The image 6', taken again by the objective 5, will appear as an image 4' at the focus of the ocular. The spacing separating 4 from 4' will be equal to $2d \times G$, in which $$G = \frac{\text{distance 4—5}}{\text{distance 5—6}}$$

On the drawing, in Fig. 2, the reflected beam seems to be bent in 6', but this is only to make the path of the beam clearer. In fact, the reflected beam is straight and much closer to the incoming beam.

The apparent size of the image 4' is not affected, for the reason mentioned above, by the magnifying power G of the objective 5. This magnifying power only influences the lateral displacement of 4 into 4' as shown on Fig. 4.

The lighting of the device is insured by a lamp 9, a diffuser 10 and a prism 11 directing the bundle of light towards the objective 5.

Having thus described the object of the invention in a way to make it clear to those acquainted with the art, what is claimed to be new is:

An optical device for checking the alignment of geometrical axes of two mechanical parts comprising a reflecting element mounted on one of the parts concentrically of the axis of the latter, said reflecting element being so curved that incident rays passing through the center of the curvature are reflected back to said center, a reference mark mounted on the other part, an ocular mounted on the second mentioned part for the observation of said mark and its reflected image, and an objective mounted on the second mentioned part, the axes of said ocular and said objective being coincident with the axis of the second part, said objective being disposed between the reflecting element and the mark and so positioned as to form an image of the mark at a point which coincides with the center of curvature when the axes of the parts are aligned with each other, the distance between the objective and said center being substantially less than the distance between the objective and said mark.

FERNAND TURRETTINI.